(12) United States Patent
Zhang

(10) Patent No.: US 10,380,618 B2
(45) Date of Patent: Aug. 13, 2019

(54) APPARATUS, METHOD, AND SYSTEM FOR PROVIDING DIGITAL COUPONS

(71) Applicant: Verizon Patent and Licensing Inc., Arlington, VA (US)

(72) Inventor: Zhi-Hong Zhang, Foster City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1089 days.

(21) Appl. No.: 14/470,519

(22) Filed: Aug. 27, 2014

(65) Prior Publication Data

US 2016/0063528 A1    Mar. 3, 2016

(51) Int. Cl.
*G06Q 30/02* (2012.01)

(52) U.S. Cl.
CPC ..... *G06Q 30/0207* (2013.01); *G06Q 30/0225* (2013.01)

(58) Field of Classification Search
CPC ........... G06Q 30/0217; G06Q 30/0219; G06Q 30/0224; G06Q 30/0225; G06Q 30/0235; G06Q 30/0236; G06Q 30/0237; G06Q 30/0238; G06Q 30/0207
USPC ......... 705/14.19, 14.21, 14.25, 14.26, 14.35, 705/14.36, 14.37, 14.38, 14.1
See application file for complete search history.

(56) References Cited

U.S. PATENT DOCUMENTS

| | | | |
|---|---|---|---|
| 2003/0220866 A1* | 11/2003 | Pisaris-Henderson | G06Q 30/02 705/37 |
| 2004/0225560 A1* | 11/2004 | Lewis | G06Q 30/02 705/14.35 |
| 2005/0209921 A1* | 9/2005 | Roberts | G06Q 30/02 705/14.13 |
| 2008/0160956 A1* | 7/2008 | Jackson | H04M 3/02 455/406 |
| 2012/0134480 A1* | 5/2012 | Leeds | H04M 1/57 379/88.12 |
| 2013/0185137 A1* | 7/2013 | Shafi | G06Q 30/02 705/14.35 |
| 2013/0187850 A1* | 7/2013 | Schulz | G06F 3/03 345/156 |
| 2014/0177813 A1* | 6/2014 | Leeds | H04M 3/02 379/67.1 |
| 2015/0371254 A1* | 12/2015 | Pugh | G06Q 30/0224 705/14.25 |

* cited by examiner

*Primary Examiner* — Scott D Gartland

(57) ABSTRACT

An approach for providing contextually relevant digital coupons on a user device is disclosed. A selection platform initiates a request for a digital coupon based on a first movement sensed at a device. A coupon category based on the request is determined and the digital coupon is selected. The selected digital coupon is then delivered to the device based on the request. Further, another or subsequent movement sensed at the device initiates another request for another digital coupon. The another digital coupon is selected from the determined coupon category.

24 Claims, 14 Drawing Sheets

APPARATUS, METHOD, AND SYSTEM FOR PROVIDING DIGITAL COUPONS

BACKGROUND INFORMATION

Service providers are continually challenged to deliver value and convenience to consumers by providing compelling services and advancing the underlying technologies. One area of interest has been the development of services and technologies for shopping and related commercial activities (e.g., providing digital coupons). These efforts have resulted in a crowded marketplace for sharing coupons and other discount information, as well as in the mechanisms for delivering coupon information to end users, particularly via their mobile devices. This can make it difficult for users to discover and/or access digital coupons when needed (e.g., at a point of sale). Accordingly, service providers face significant technical challenges to enabling delivery of contextually relevant digital coupons to mobile devices at a time and place where the digital coupon is most likely to be used.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and system for providing contextually relevant digital coupons to a consumer at an appropriate location and time based on a request, is described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

With the heightened popularity of e-mails, users now receive a deluge of digital coupons from plurality of e-mil sources. The situation has become so unpleasant that that the capability of being able to manage the digital coupons has almost become a hindrance to being productive. Further, receiving such large numbers of digital coupons via e-mails adds to internet congestion problems by consuming large amounts of storage space and bandwidth. On the other hand, users may perceive push messages as annoying, especially if they contain promotions (e.g., digital coupons) or if the promotions are repetitive and not relevant. Needless to mention, it is tedious and time-consuming for users to go over the numerous digital coupons in their mobile devices to find a digital coupon of their interest. The user needs to use different applications back-and-forth or search different websites on the small screen of their mobile device. In addition, such action consumes battery and data. Ideally, such prompting mechanism should be based on user preferences of when they want to be interrupted and notified on a content that is relevant to them. Such approach is contributing to negative user experience. Therefore, a system that provides relevant digital coupons at a particular shopping mood in the nearby area is required.

Figure 1:
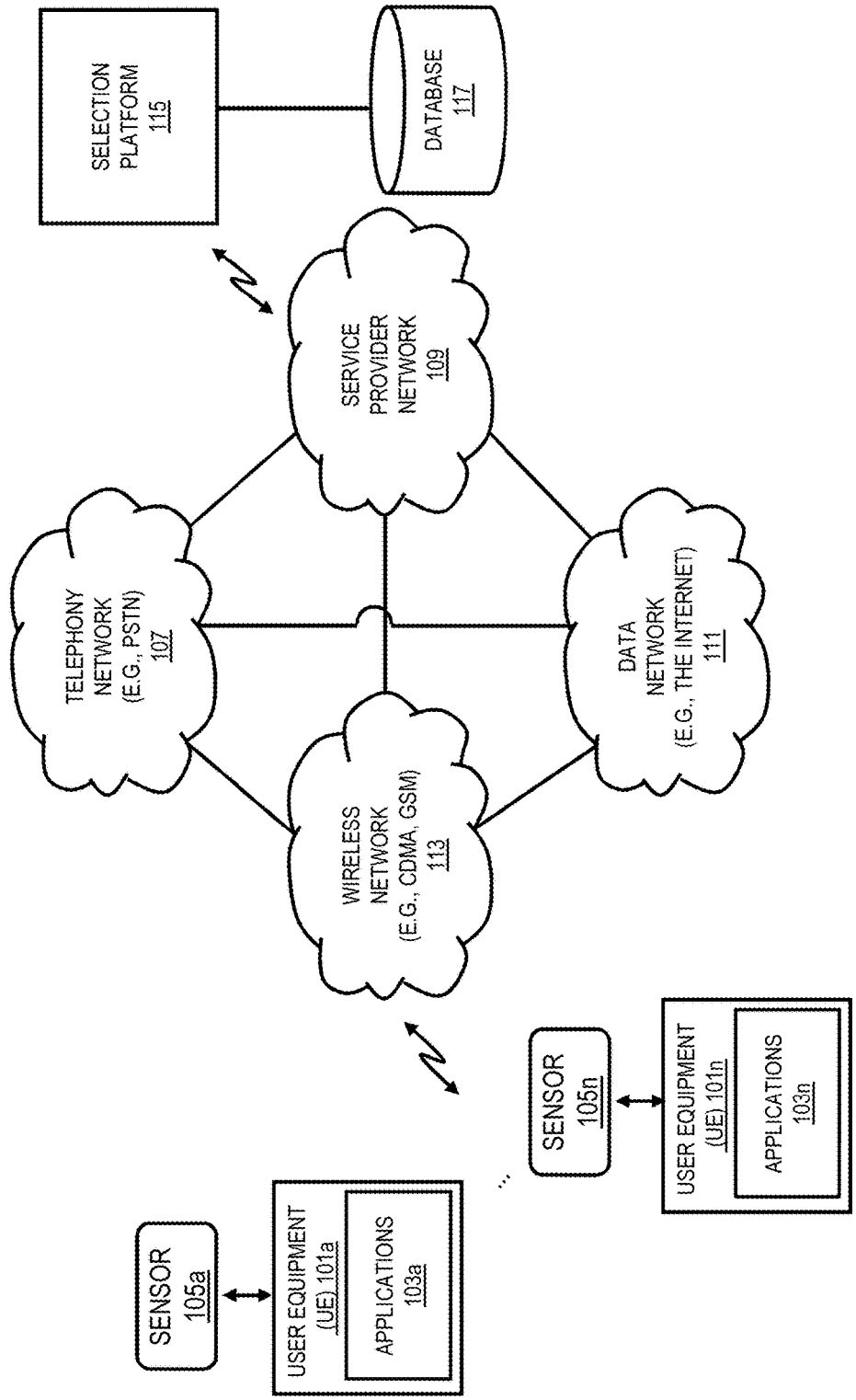
FIG. 1 is a diagram of a system capable for providing contextually relevant digital coupons to a consumer at an appropriate location and time based on a request, according to one embodiment.

FIG. 1 is a diagram of a system capable of providing contextually relevant digital coupons to a consumer at an appropriate location and time based on a request. For the purpose of illustration, a system 100 employs, in certain embodiments, user equipment 101a-101n, hereinafter referred to as a user device 101. In one embodiment, the user device 101 may include, but is not restricted to, a computer, a laptop, a Personal Digital Assistance (PDA), a tablet, a smart phone, a palmtop, a netbook, or any communication enabled computing device that are configured to receive digital coupons from an advertiser. The advertiser may include, but is not restricted to, a merchant, a retailer, a wholesaler, a vendor, a supplier, and the like.

In certain embodiments, a "digital coupon" may be considered as, but is not restricted to, an offer, an incentive, a discount, a reward, or any other program provided by an advertiser for encouraging or enticing a consumer to purchase a product and/or a service. In an exemplary embodiment, the digital coupon may include information such as, a discount percentage, a price reduction, details regarding a product and/or service being offered, details regarding a retailer and/or vendor, an expiration date, a participating store location, a discount code, and the like.

The user device 101 may further include applications 103a-103n, hereinafter referred to as application 103. In one embodiment, the application 103 may be considered as a Graphical User Interface (GUI) of the user device 101 that provides options to consumers to select a digital coupon category for a required digital coupon. For example, a consumer desires to have a cup of coffee then the consumer selects a category such as a "coffee" in the application 103 of the user device 101. The application 103 is further configured to receive inputs from a consumer, which are associated with the required digital coupon. In addition, the user device 101 may facilitate various input means for receiving inputs from consumers, including, but is not restricted to, a touch screen capability, a keyboard and keypad data entry, a voice-based input mechanism, an accelerometer, and the like. Any known and future implementations of the user device 101 are applicable. In another embodiment, the application 103 is configured to receive the digital coupons from a service provider. The application 103 further transmits the inputs to a selection platform 115.

Further, the user device 101 may use sensors 105a-105n, hereinafter referred to as sensor 105, to sense movement at the user device 101. In one implementation, the movement may include, but is not restricted to, a particular body movement (e.g., a shaking movement of the user device 101), a unique movement, etc. In another implementation, the sensor 105 may further sense more than one movement of the user device 101.

The sensor 105 may also be configured to sense emotions of the consumers. The emotion of the consumer may include, but is not restricted to, happy, sad, angry, excited, stressed, and the like. The sensor 105 may determine the emotions of the consumers from, but is not restricted to, their touch on a Graphical User Interface (GUI) of a user device 101, usage of their user device 101, gestures, and the like. Further, the sensor 105 is configured to determine location information associated with the user device 101. In one implementation, the sensor 105 may transmit the sensed movement of the user device 101 to the application 103. In another implementation, the sensor 105 may transmit the sensed movement of the user device 101 to the selection platform 115. The sensor 105 may be, but is not restricted to, a gyroscope, an accelerometer, a compass, a Global Positioning System (GPS) sensor and the like. In one example embodiment, a sensor 105 may be a wearable device that is paired with the user device 101 to track body movements.

Further, the user device 101 may use the sensor 105 may to communicate with the selection platform 115 through various networks including a telephony network 107, a service provider network 109, a data network 111, a wireless network 113, and the like. For illustrative purposes, the networks 107-113 may be any suitable wireless networks, and are managed by service providers. For example, the telephony network 107 may include, but is not restricted to, a circuit-switched network, such as the Public Switched Telephone Network (PSTN), an Integrated Services Digital Network (ISDN), a Private Branch Exchange (PBX), or other like networks.

Although depicted as separate entities, the networks 107-113 may be completely or partially contained within one another, or may embody of the aforementioned infrastructures. For instance, a service provider network 109 may embody circuit-switched and/or packet-switched networks that may include facilities to provide for transport of circuit-switched and/or packet-based communications. It is further contemplated that the networks 107-113 may include components and facilities to provide signaling and/or bearer communications between the various components or facilities of the system 100. In this manner, the networks 107-113 may embody or include portions of a signaling system 7 (SS7) network, or other suitable infrastructure to support control and signaling functions. In addition, the system 100 may operate as separate parts that rendezvous and synchronize periodically to form a larger system with similar characteristics.

Further, data network 111 may be any Local Area Network (LAN), Metropolitan Area Network (MAN), Wide Area Network (WAN), the Internet, or any other suitable packet-switched network, such as a commercially owned, proprietary packet-switched network, such as a proprietary cable or fiber-optic network. Further, wireless network 113 may employ various technologies including, for example, Code Division Multiple Access (CDMA), Enhanced Data Rates For Global Evolution (EDGE), General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, e.g., microwave access (WiMAX), Wireless Fidelity (Wi-Fi), satellites, and the like.

Further, the selection platform 115 may receive the consumer's inputs, for example, selected digital coupon category, from the application 103, in one embodiment. The selection platform 115 may further receive movement sensed at the user device 101 from the sensor 105, in one embodiment. In another embodiment, the selection platform 115 may receive the sensed movement and the consumer inputs from the application 103 of the user device 101. In another embodiment, the selection platform 115 may receive location information of the user device 101. The selection platform 115 may generate a request based on the received data (e.g., sensed movement, consumer inputs, location information, etc.). Further, the selection platform 115 may select a digital coupon based on the received data. In one embodiment, these digital coupons are made available by the selection platform 115, and according to certain embodiments, may be provided in the form of an electronic coupon. In one implementation, the selection platform 115 may be maintained by a service provider (e.g., a wireless communication company) as a hosted or subscription based service made available to users of user device 101 through the service provider network 109. In order to avail the service of receiving digital coupons, the consumers may have to register themselves with the service provider. Also, the advertisers may have to perform a registration process to register themselves with the service provider to provide the digital coupons to the consumers. In an exemplary embodiment, the selection platform 115 enables the service provider, individual users of user device 101 subscribed with the service provider, and a network of suppliers to exchange information (e.g., coupon information) regarding deals of potential interest to the consumers.

Further, the selection platform 115 may transmit the selected digital coupon to the user device 101. In one embodiment, the selection platform 115 may transmit the digital coupon by, but is not restricted to, a text message, a voice mail, an email, a pop-up in the application 103, and the like. The consumer may then redeem the digital coupon at a retail store associated with the digital coupon. In one embodiment, the customer may bring the user device to a retailer to scan the digital coupon on a Point of Sale (POS) terminal. In one implementation, the POS terminal may be a computerized device for conducting a financial or payment transaction in relation to a product and/or or service purchase by using the digital coupon. The POS terminal may include, for example, functions for recording and tracking consumer orders, processing credit and debit cards (e.g., featuring built-in payment acceptance and processing systems) and managing inventory and deliveries. In addition, the POS terminal may connect to other systems and devices over a communication network, including those systems and devices directly within the environment of its operation (e.g., other POS systems or computers within the retailer/vendor location) as well as external systems. It may also be configured to enable communication with the user device 101 by using a Near Field Communication (NFC), Bluetooth, ZigBee, or other wireless communication technologies. Of note, the POS terminal may be implemented as a physical device resident at the location of a retailer, as an online transactional platform, or a combination thereof. In the latter example, the user is able to engage purchase and payment transactions with the retailer by way of a web portal or browser application at the user device 101.

In another embodiment, a retailer's Quick Response (QR) code may be scanned from the user device 101 to redeem the digital coupon. In yet another embodiment, a consumer may click on a web link or an icon on a digital coupon to redeem the coupon with a retailer. Further, the selection platform 115 may format display of the digital coupon on the user device 101. In one implementation, the display format may be optimized based on a type of a user device 101.

The selection platform 115 may store the digital coupons associated with the advertisers in a database 117. The database 117 may store the digital coupons from all the advertisers. The database 117 may also store profiles of the consumers, in one embodiment. In an exemplary embodiment, the consumer profile may include, but is not restricted to, a name, an email address, a phone number, a transaction history, a purchasing history, type of coupons redeemed, number of coupons redeemed, shopping statistics and habits, a product preference, and so forth. The consumer profile may be used to identify the consumer at the time of selecting a digital coupon for the customer. The database 117 may also store profiles of the advertisers, in another embodiment. The advertiser's profile may include, but is not restricted to, a name, type of products and/or services offered, digital coupons, a bidding history, and the like. Further, the database 117 may store pre-defined formats of digital coupons. The components of the selection platform 115 are described in conjunction with FIG. 2.

Figure 2:
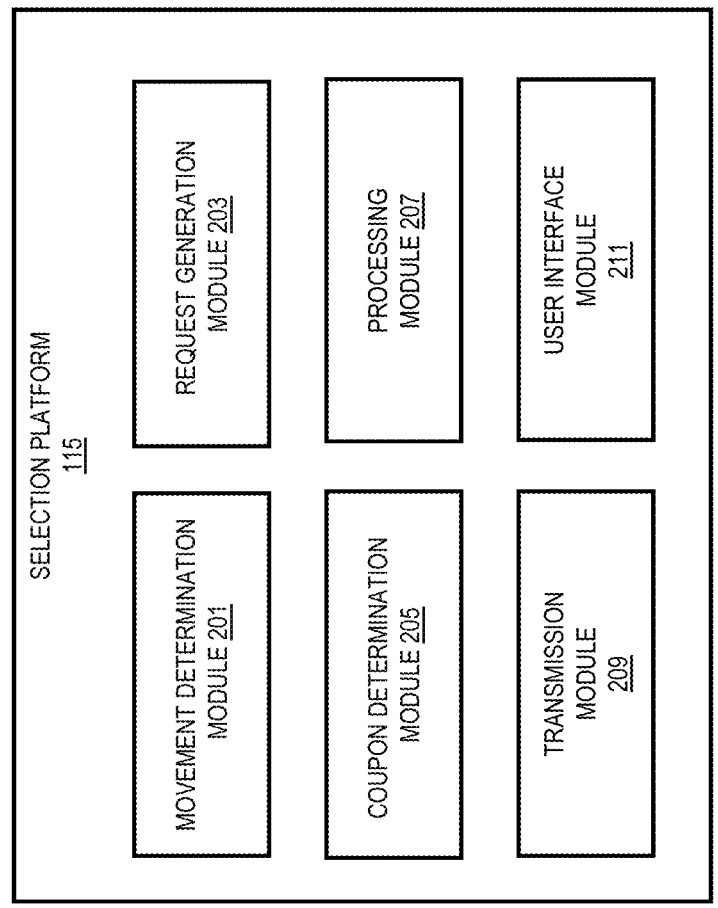
FIG. 2 is a diagram of components of a selection platform, according to one embodiment.

FIG. 2 is a diagram of components of the selection platform 115 for providing contextually relevant digital coupons to a consumer at an appropriate location and time based on a request, according to one embodiment. The selection platform 115 may include a movement determination module 201, a request generation module 203, a coupon determination module 205, a processing module 207, a transmission module 209, and a user interface module 211.

The movement determination module 201 may determine a movement at the user device 101, in one embodiment. In one implementation, the movement may be, but is not restricted to, a particular body movement (e.g., a shaking movement of the user device 101), a unique movement, etc. The movement determination module 201 may determine a second movement, another subsequent movement, or a combination thereof, sensed at the user device 101. In one embodiment, the movement at the user device 101 may be sensed by the sensor 105 associated with the user device 101. In one embodiment, the sensor 105 transmits the movement to the movement determination module 201.

The request generation module 203 may generate a request for digital coupons based on the movements sensed at the user device 101. In an exemplary embodiment, the request generation module 203 may initiate a request for providing contextually relevant digital coupons when the consumer shakes the user device 101 once. Further, the request generation module 203 may initiate another request for another digital coupon when a second movement is sensed at the user device 101.

The coupon determination module 205 may receive data from the consumer through the user device 101, in one embodiment. The data may include, but is not restricted to, a category of a product and/or service, location information of the user device 101, an emotion of a user, and the like. The emotion of the consumer may include, but is not restricted to, happy, sad, angry, excited, stressed, and the like. In one embodiment, the emotions of the consumer may be determined by the sensor 105. In one implementation, the data may be received from the user device 101 through the application 103 installed in the user device 101.

The coupon determination module 205 may further determine coupon selection parameters. The coupon selection parameters may be associated with the user device 101, a user and/or consumer of the user device 101, or a combination thereof. In one embodiment, the coupon selection parameters may include, but are not restricted to, range of proximity, a percentage of discount, a retail category, a position of a digital coupon, a geography of a retailer, number of coupons, and the like. The coupon determination module 205 may also determine location information associated with the user device 101. In one embodiment, the location information may include geolocation coordinates, a region, a type of place, for example, a shopping mall, and the like.

Further, the coupon determination module 205 may determine a digital coupon category of the digital coupon. In one embodiment, the category of the digital coupon may be selected based on the determined coupon selection parameters. For example, if the consumer desires to have his favorite cuisine in lunch at a shopping mall, then based on coupon selection parameters such as, a proximity range and a retail category (e.g., type of cuisine), a category "food" for the digital coupon is determined. The coupon determination module 205 may select a digital coupon from a list of digital coupons stored in the database 117. The digital coupon may be selected based on the determined digital coupon category, in one embodiment.

In one embodiment, the coupon category determination, the selection of the digital coupon or a combination thereof, may be based on the determined location information of the user device 101, user of the user device 101, or a combination thereof.

The processing module 207 may receive a prioritization request from a coupon broker to place a candidate digital coupon for delivery. The coupon provider may be, but is not restricted to, a retailer, a vendor, a supplier, a coupon broker, and the like. The candidate digital coupon may be considered as a digital coupon stored in a database associated with the coupon provider. In one embodiment, the prioritization request may specify coupon delivery parameters received from the coupon provider. The coupon delivery parameter may include, but is not restricted to, provide coupon 1 when a first movement sensed at a user device 101, provide coupon 2 when a second movement sensed at a user device 101, and so forth. In one scenario, coupon 1 may be displayed on the screen and may be replaced by coupon 2 after the second shake. In another scenario, coupon 1 may be displayed on top of the screen in a smaller size, and coupon 2 may be displayed on the middle of the screen after the second shake.

The prioritization request may be based on a result of a bidding process among the coupon providers and the one or more coupon providers, in one embodiment. The coupon providers of a geo-fence area compete with each other to bid for a position on the list of digital coupon. In an exemplary embodiment, coupon providers provide a real time bid for providing their candidate digital coupons as digital coupons to the consumers.

The coupon determination module 205 may then select the candidate digital coupon as the digital coupon for delivery to the user device 101 when a movement, for example, a first movement, a second movement, another subsequent movement, or a combination thereof, is sensed at the user device 101 based on the prioritization request, in one embodiment. In another embodiment, the coupon determination module 205 may select the candidate digital coupon as the digital coupon based on the determined coupon delivery parameters.

The transmission module 209 may deliver the digital coupon to the user device 101 based on the generated request. In one embodiment, the digital coupon may be delivered to the user device 101 through, but not restricted to, a text message, an email, a pop-up in the application 103 of the user device 101, and the like. In one embodiment, the transmission module 209 may deliver one digital coupon at a time. When a second movement, another subsequent movement, or a combination thereof, is sensed at the user device 101 then another digital coupon may be transmitted to the user device 101.

The transmission module 209 may further generate a report of the delivery of the digital coupon of the user device 101. In one embodiment, the report may include, but is not restricted to, a bill, a digital coupon number, a consumer name, a date and/or time of delivery, a bidding price for a digital coupon, number of sensed movements at a user device 101, and the like. Further, the transmission module 209 may deliver the report to a coupon provider associated with the digital coupon delivered to the user device 101. In one embodiment, the report may be recorded in a coupon billing and/or account system. The coupon provider may pay fees such as a subscriber's fee, for the digital coupons delivered to the user device 101, in one embodiment. In another embodiment, the coupon provider may pay fees for the digital coupons redeemed by the consumers at a retail store associated with the digital coupon.

The user interface module 211 may display the digital coupon on the user device 101. In one implementation, the user interface module 211 may operate in connection with the transmission module 209 to enable presentation of the digital coupon on the user device 101. In one embodiment, the user interface module 211 may generate a user interface in response to Application Programming Interfaces (APIs) or other function calls corresponding to a web browser or web portal application of the user device 101 for enabling display of graphical and textual elements of the digital coupon. It may be noted, the user interface may be generated at the consumer's user device 101 to enable viewing of the digital coupon pursuant to execution of a purchase transaction with a retailer.

The user interface module 211 may personalize the digital coupon prior to delivering of the digital coupon to the user device 101. The personalization of the digital coupon may include, but is not restricted to, formatting of the digital coupon. In one embodiment, the user interface module 211 may personalize the digital coupon prior to delivering of the digital coupon based on a user device, a consumer associated with the user device 101, or a combination thereof. The user interface module 211 may personalize the digital coupon based on the predefined formats of the digital coupons, in another embodiment.

Figure 3:
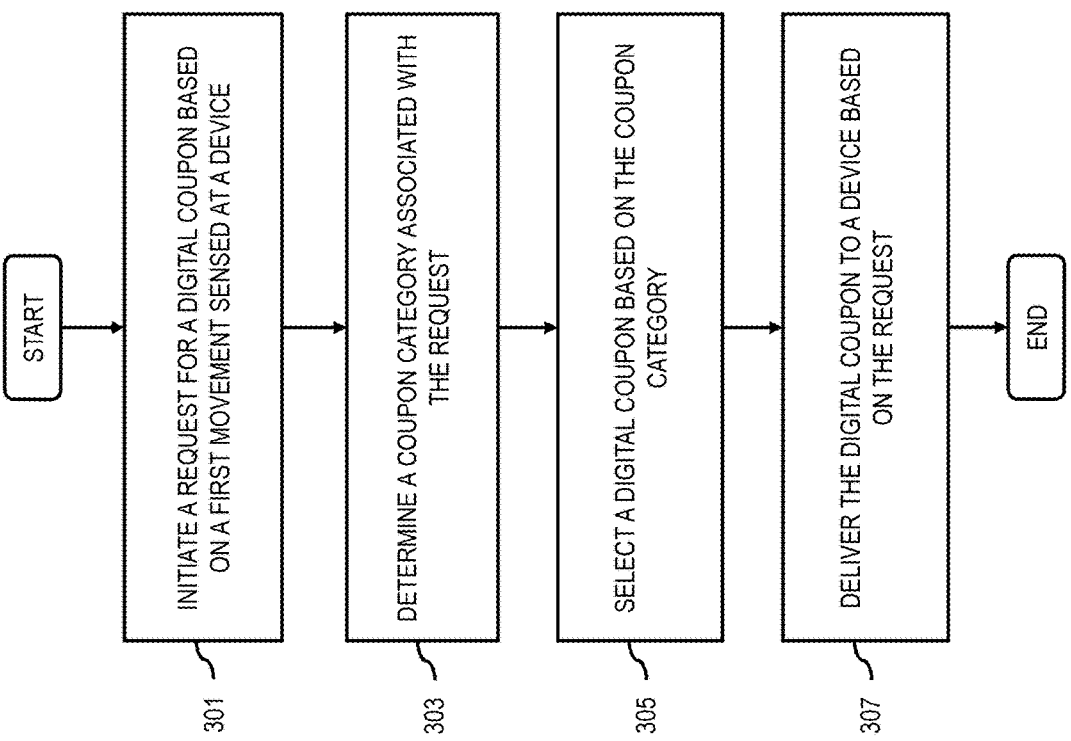
FIG. 3 is a flowchart of a process for providing contextually relevant digital coupons to a consumer at an appropriate location and time based on a request, according to one embodiment.

FIG. 3 is a flowchart of a process for providing a digital coupon to a consumer based on a request, according to an embodiment. At step 301, a selection platform 115 initiates a request for a digital coupon based on a first movement sensed at a user device 101. In one implementation, the selection platform 115 determines a movement at the user device 101. The movement may be, but is not restricted to, a shaking movement of the user device 101. When the shaking movement is sensed at the user device, the selection platform 115 initiates a request for the digital coupon. Further, the selection platform 115 initiates another request for another digital coupon when a second movement is sensed at the user device 101.

At step 303, the selection platform 115 determines a coupon category associated with the request. In one embodiment, the category of the digital coupon may be selected based on coupon selection parameters. In one embodiment, the coupon selection parameter may include, but is not restricted to, a range of proximity, a percentage of discount, a retail category, a position of a digital coupon, a geography of a retailer, number of coupons, and the like. For example, if the consumer desires to have favorite cuisine in dinner at a shopping mall, then based on coupon selection parameters such as, a proximity range and a retail category (e.g., type of cuisine), a category "food" for the digital coupon is determined. Also, the selection platform 115 determines location information associated with the user device 101, a user of a user device 101, or a combination thereof.

Next, at step 305, the selection platform 115 selects a digital coupon based on the determined coupon category. Thereafter, at step 307, the selection platform 115 delivers the selected digital coupon to the user device 101 based on the request. In one embodiment, the digital coupon may be delivered to the user device 101 through, but is not restricted to, a text message, a voice mail, an email, a pop-up in the application 103 of the user device 101, and the like.

Figure 4:
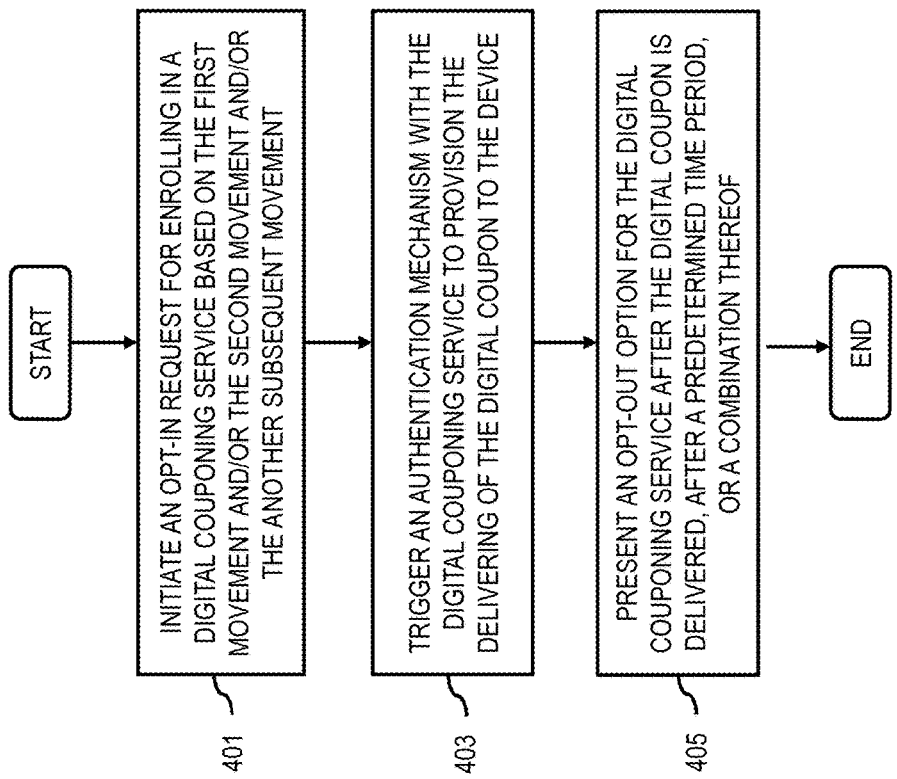
FIG. 4 is a flowchart of a process for initiating an opt-in request and an authentication mechanism for provisioning a delivery of the digital coupon, according to another embodiment.

FIG. 4 is a flowchart of a process for initiating an opt-in request and an authentication mechanism for provisioning a delivery of the digital coupon, according to another embodiment.

In step 401, the selection platform 115 initiates an opt-in request for enrolling in a digital couponing service based on the first movement, the second movement, the another subsequent movement, or a combination thereof. In one scenario, the shaking or any other unique movement may trigger a real-time opt-in of a message push service, and the session may automatically opt-out immediately or after a short period of time (e.g. 30 minutes). In one example embodiment, the selection platform 115 may trigger a digital coupon service in real-time based, at least in part, on a shake or a unique movement by a user. For example, a user shakes his user device 101 and receives a digital coupon for ABC restaurant. The user on his way to ABC restaurant passes by DFC clothing store. Then, the selection platform 115 may process user preference information, historical user information, or a combination thereof to present one or more coupons for DFC clothing store to the user. Such precision marketing method eliminates providing irrelevant digital coupons to users. In another scenario, the selection platform 115 may determine to retract a digital coupon after a certain time threshold. In one example embodiment, the selection platform 115 may retract unused digital coupons from a user device 101.

In step 403, the selection platform 115 triggers an authentication mechanism with the digital couponing service to provision the delivering of the digital coupon to the device.

In step 405, the selection platform 115 presents an opt-out option for the digital couponing service after the digital coupon is delivered, after a predetermined time period, or a combination thereof. In one scenario, the selection platform 115 may cause the digital couponing service to opt-out immediately after the successful delivery of a coupon. In another scenario, the selection platform 115 may cause the digital couponing service to opt-out after a short period of time upon successful delivery of multiple coupons.

Figure 5:
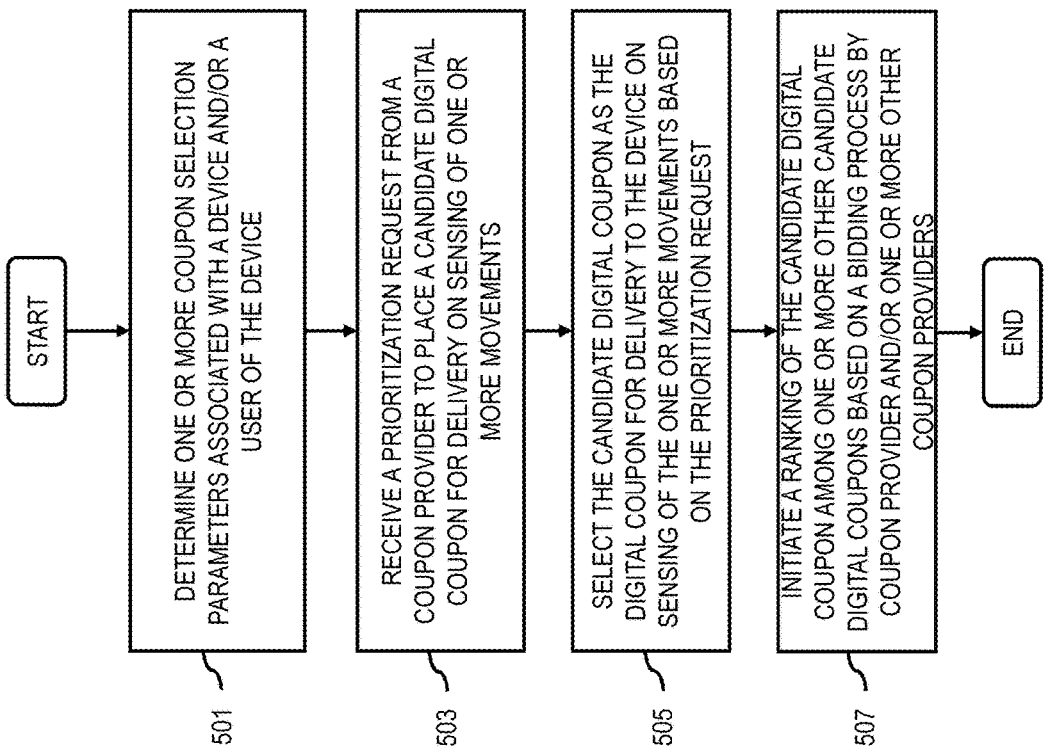
FIG. 5 is a flowchart of a process for selecting a digital coupon based on a prioritization request, according to another embodiment.

FIG. 5 is a flowchart of a process for selecting a digital coupon based on a prioritization request from an advertiser, according to another embodiment. At step 501, a selection platform 115 determines coupon selection parameters. The coupon selection parameters may be associated with the user device 101, a user and/or consumer of the user device 101, or a combination thereof. In one embodiment, the coupon selection parameters may include, but are not restricted to, a range of proximity, a percentage of discount, a retail category, a position of a digital coupon, a geography of a retailer, number of digital coupons, and the like. The selection platform 115 further determines location information associated with the user device 101. In one embodiment, the location information may include geolocation coordinates, region, type of place, for example, a shopping mall, and the like.

At step 503, the selection platform 115 receives a prioritization request from a coupon provider to place a candidate digital coupon for delivery. The coupon provider may be, but is not restricted to, a retailer, a vendor, a supplier, a coupon broker, and the like. The candidate digital coupon may be considered as a digital coupon stored in a database associated with the coupon provider. In one embodiment, the prioritization request may specify coupon delivery parameters received from the coupon provider. The coupon delivery parameters may include a geo-fence. In an exemplary embodiment, the coupon delivery parameter may include, but is not restricted to, provide coupon 1 when a first movement sensed at a user device 101, provide coupon 2 when a second movement sensed at a user device 101, and so forth. In one scenario, coupon 1 may be displayed on the screen and may be replaced by coupon 2 after the second shake. In another scenario, coupon 1 may be displayed on top of the screen in a smaller size, and coupon 2 may be displayed on the middle of the screen after the second shake.

The prioritization request may be based on a result of a bidding process among the coupon provider and the one or more coupon providers, in one embodiment. The coupon providers of geo-fence area compete with each other to bid for a position and/or spot on a list of digital coupon for consumers.

Next, at step 505, the selection platform 115 selects the candidate digital coupon as the digital coupon for delivery to the user device 101 when a movement, for example, a first movement, a second movement, another subsequent movement, or a combination thereof, is sensed at the user device 101. In one embodiment, the selected candidate digital coupon may be delivered to the user device 101 based on the prioritization request. In another embodiment, the coupon determination module 205 may select the candidate digital coupon as the digital coupon based on the coupon delivery parameters.

In step 507, the selection platform 115 initiates a ranking of the candidate digital coupon among one or more other candidate digital coupons based on a bidding process by coupon provider, one or more other coupon providers, or a combination thereof. In one embodiment, the selection of the candidate digital coupon as the digital coupon is further based on the ranking. In one scenario, the advertisers bid to fix their position to display their digital coupons on a user device, where advertiser with the highest bidding price gets the highest ranking. Further, a geo-fence area for providing digital coupons to one or more mobile devices is based, at least in part, on the bidding process.

Figure 6:
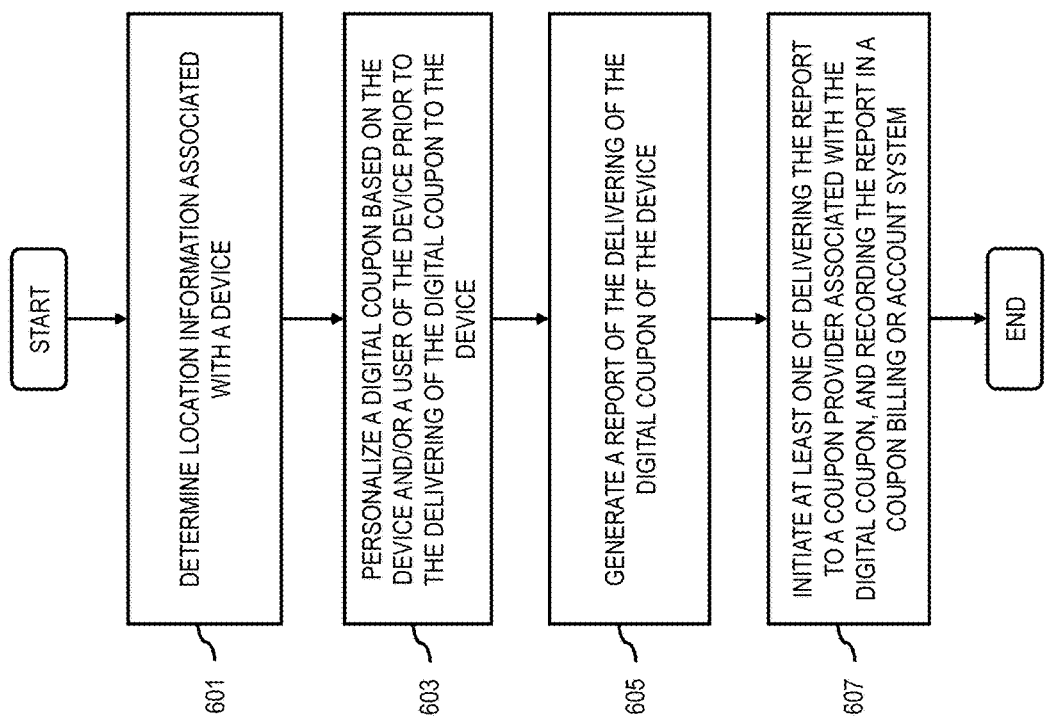
FIG. 6 is a flowchart of a process for generating a coupon delivery report, according to one embodiment.

FIG. 6 is a flowchart of a process for generating a coupon delivery report, according to an embodiment. At step 601, a selection platform 115 determines location information associated with a user device 101. In one embodiment, the location information may include geolocation coordinates, a region, a type of place, for example, a shopping mall, and the like.

Further, at step 603, the selection platform 115 personalizes a digital coupon prior to delivering of the digital coupon to the user device 101. The personalization of the digital coupon may include, but is not restricted to, formatting of the digital coupon. In one embodiment, the selection platform 115 personalizes the digital coupon prior to delivering of the digital coupon based on a user device, a consumer associated with the user device 101, or a combination thereof.

Thereafter, at step 605, the selection platform 115 generates a report of the delivering of the digital coupon to the user device 101. In one embodiment, the report may include, but is not restricted to, a digital coupon number, a consumer name, a date and/or time of delivery, a bidding price for a digital coupon, number of sensed movement at a user device 101, and the like.

At step 607, the selection platform 115 initiates delivery of the report to a coupon provider associated with the digital coupon delivered to the user device 101. In one embodiment, the report may be recorded in a coupon billing and/or account system. The coupon provider may then pay fees such as a subscriber's fee, for the digital coupons delivered to the user device 101, in one embodiment. In another embodiment, the coupon provider may pay subscription fees for the digital coupons redeemed by the consumers at a retail store.

Figure 7:
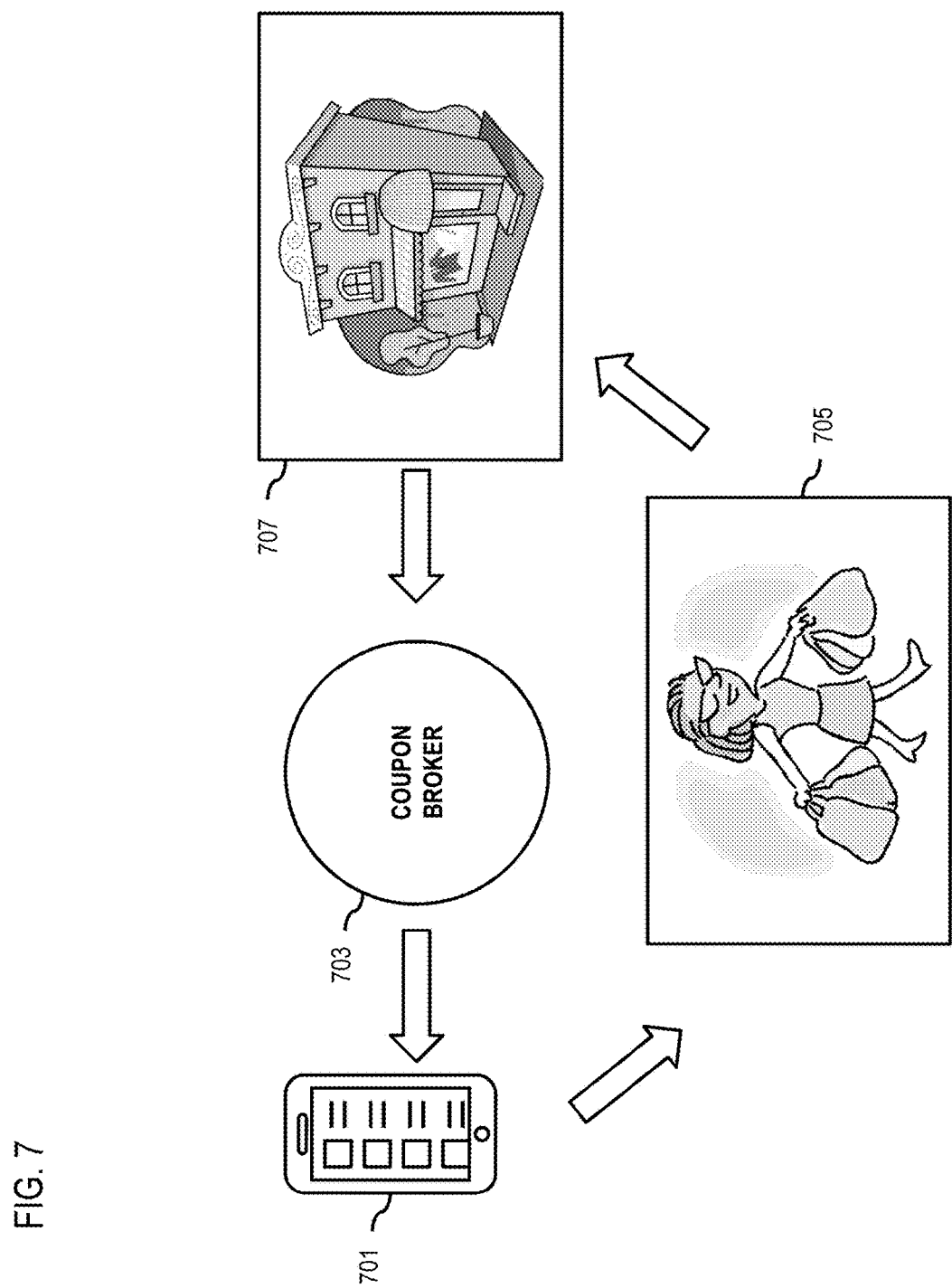
FIG. 7 is an exemplary process flow for providing a digital coupon to a user device, according to an exemplary embodiment.

FIG. 7 is an exemplary process flow for providing a digital coupon to a user device, according to one embodiment. Based on a consumer's action, such as moving a user device 701, a request for a digital coupon is initiated. In one embodiment, the movement may be, but is not limited to, a shaking movement sensed at the user device 701. Further, location information of the user device 701 and emotions of the consumer are determined by using sensors, such as sensor 105. The data (e.g., location information, emotions, etc.) along with the consumer's action is transmitted to a coupon broker 703. At the same time, when the movement is sensed at the user device 701, retailers 707 at the/nearby location of the user device compete with each other to bid for a coupon spot on the user device 701. These bids are received by the coupon broker 703 that selects a digital coupon for the customer. The selected digital coupon is then delivered to the user device 701. The consumer 705 redeems the digital coupon at a retail store associated with the digital coupon.

Figure 8:
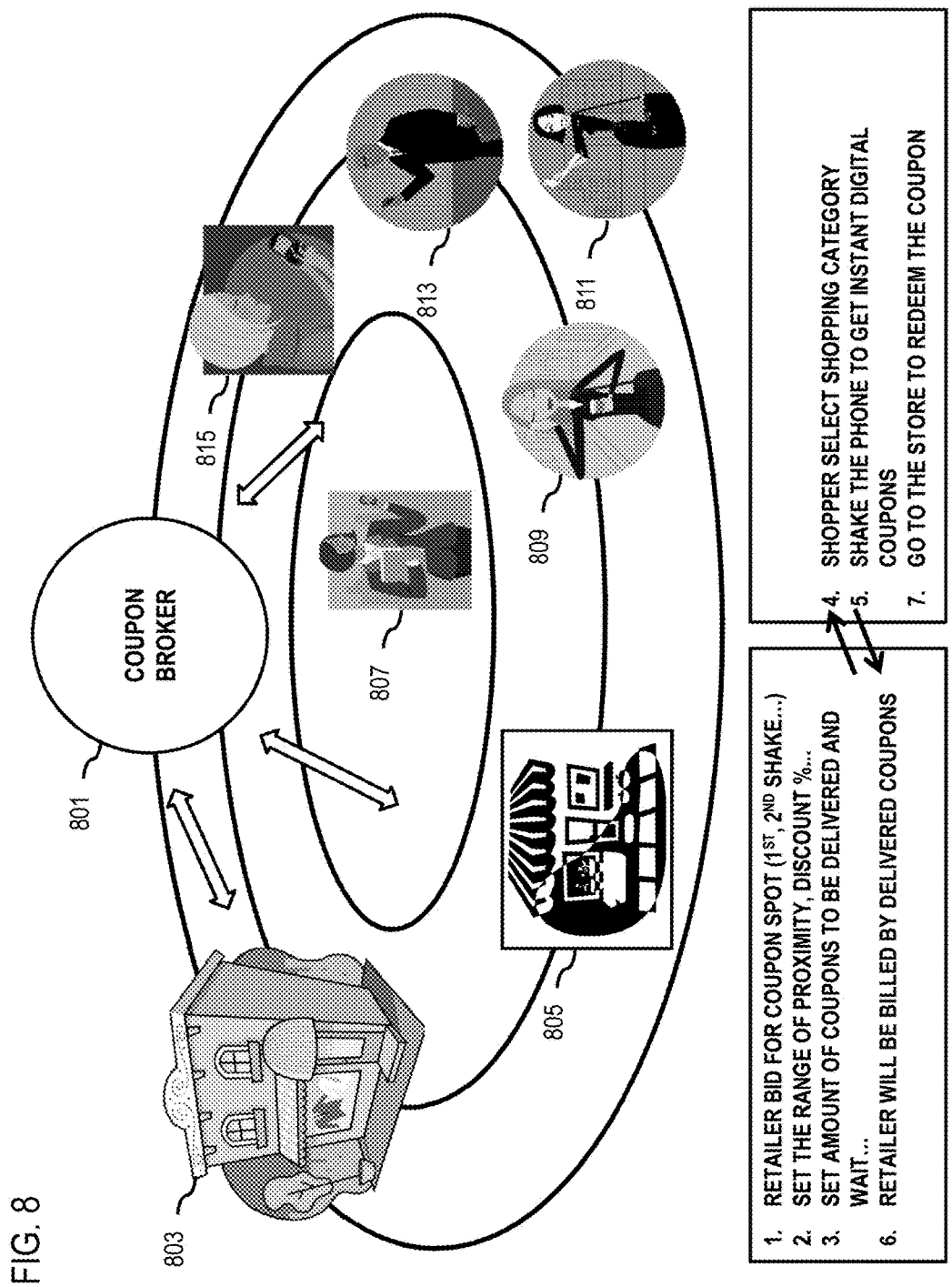
FIG. 8 is a diagram of an exemplary scenario for delivering a digital coupon to a consumer, according to an exemplary embodiment.

FIG. 8 is a diagram of an exemplary scenario for delivering a digital coupon to a consumer, according to an exemplary embodiment. A coupon broker 801 is a service provider that provides digital coupon to consumers based on their requests. Retailers of goods and/or services 803 and 805 provide bids for a coupon spot in a list of digital coupons. For example, a retailer may provide a higher bid price for a first coupon spot when a first movement is sensed at a user device, provide a lower bid price for a first coupon spot when a second movement is sensed at a user device, and so on. Further, the retailer sets coupon delivery parameters, for example, a range of proximity, a percentage of discount, a retail category, and the like. The range of proximity indicates that the retailer's candidate digital coupon may only be displayed to a consumer's user device when the user device is within a specified range of proximity (for example, 500 meters, 750 meters, etc.) provided by the retailer. Further, the retailer may provide a percentage of discounts to be provided to a consumer based on coupon delivery parameters, such as, but not limited to, a retail category, a range of proximity, and the like. The retailers may set an amount of digital coupons to be delivered to the consumers and wait for their action. For example, the retailer says that 50 digital coupons are to be delivered to consumers. Consumers 807 to 815 are located at different locations. As shown, the consumer 807 is in close proximity to the retailer 805. The consumers 809, 813, and 815 are in close proximity to the retailer 805 while the consumer 811 is far away from the retailer 803 but is comparatively in close proximity to the retailer 805.

A consumer selects a shopping category and shakes an associated user device, the movement and location information of the user device is determined. Based on the movement and the location information, a digital coupon of the retailer is selected and is then displayed on the user device. For example, if the consumer selects category "clothing", and is near to the retailer 805 then a digital coupon of the retailer 805 is selected and is provided to the consumer. Further, a bill is generated for a retailer whose digital coupon is delivered to the consumer. The consumer may then go to the retailer to redeem the digital coupon.

Figure 9:
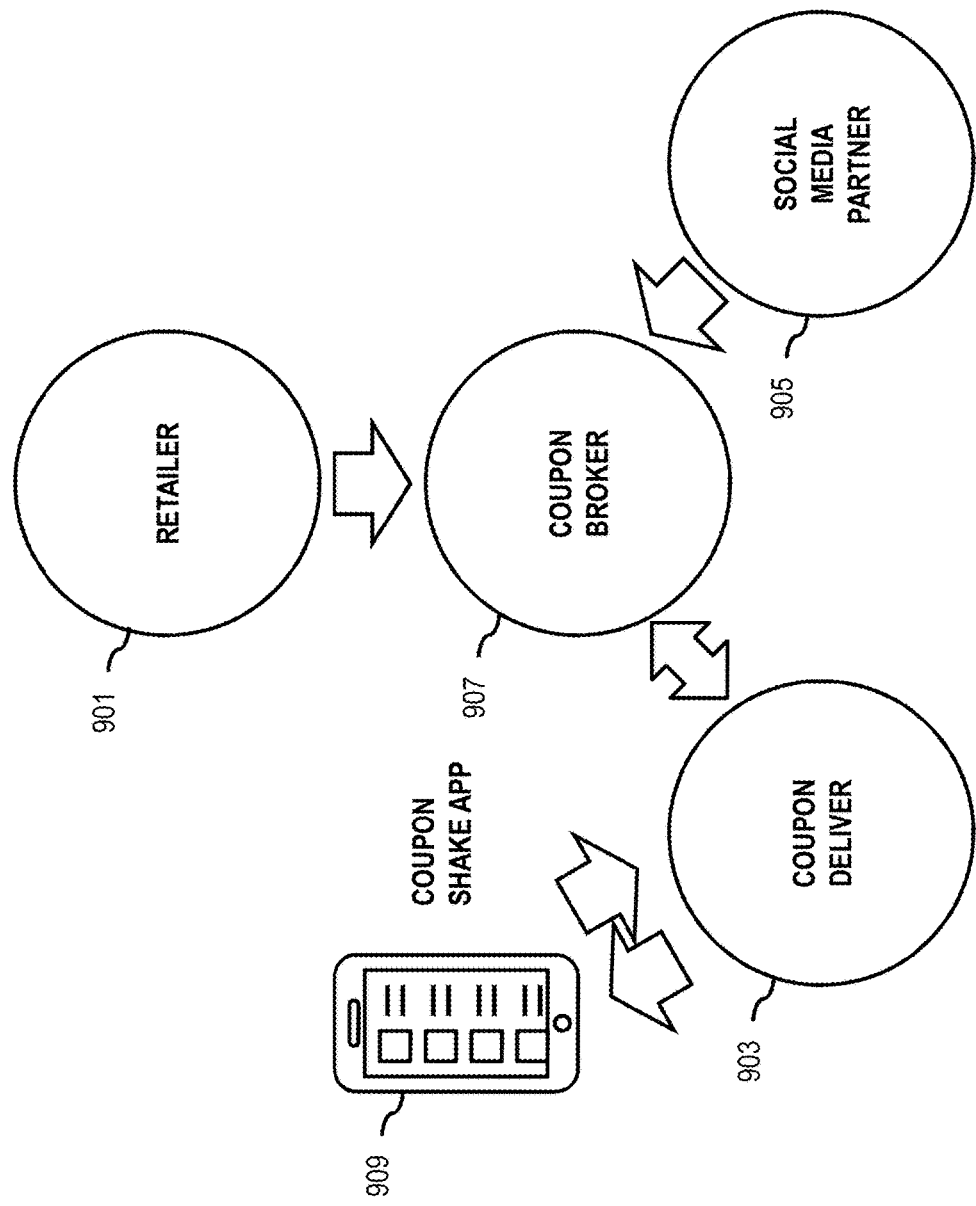
FIG. 9 is a diagram for process flow in a an exemplary digital coupon marketplace for providing a digital coupon to a user device, according to an exemplary embodiment.

FIG. 9 is a diagram for process flow in an exemplary digital coupon marketplace for providing a digital coupon to a user device, according to an exemplary embodiment. A retailer 901 and a social media partner 905 may be considered as advertisers who desire to provide their digital coupons to consumers. A coupon deliver 903 may operates in association with the retailer 901 and the social media partner 905 to communicate with a coupon broker 907 in order to provide the digital coupons to the consumers. A request for a digital coupon is received from a coupon shake application installed in a user device 909 by a consumer. The request is received when a shaking movement is sensed at the user device 909. Further, location information and emotions of the consumer are also determined by using sensors installed at the user device 909. Further, the coupon broker 907 receives bids from the retailer 901 and the social media partner 905 and then select a digital coupon based on the determined location information and emotions of the consumer. The selected digital coupon is provided to the coupon deliver 903 which further transmits it to the application of the user device 909.

In an exemplary embodiment, one digital coupon for one movement sensed at the user device is provided to the consumer. If a second movement or a subsequent movement is sensed at the user device 909, another request for a digital coupon is transmitted to the coupon broker 907 by the coupon deliver 903 and the process continues. The displayed digital coupon is then redeemed by the consumer at a retail store associated with the digital coupon.

Figure 10:
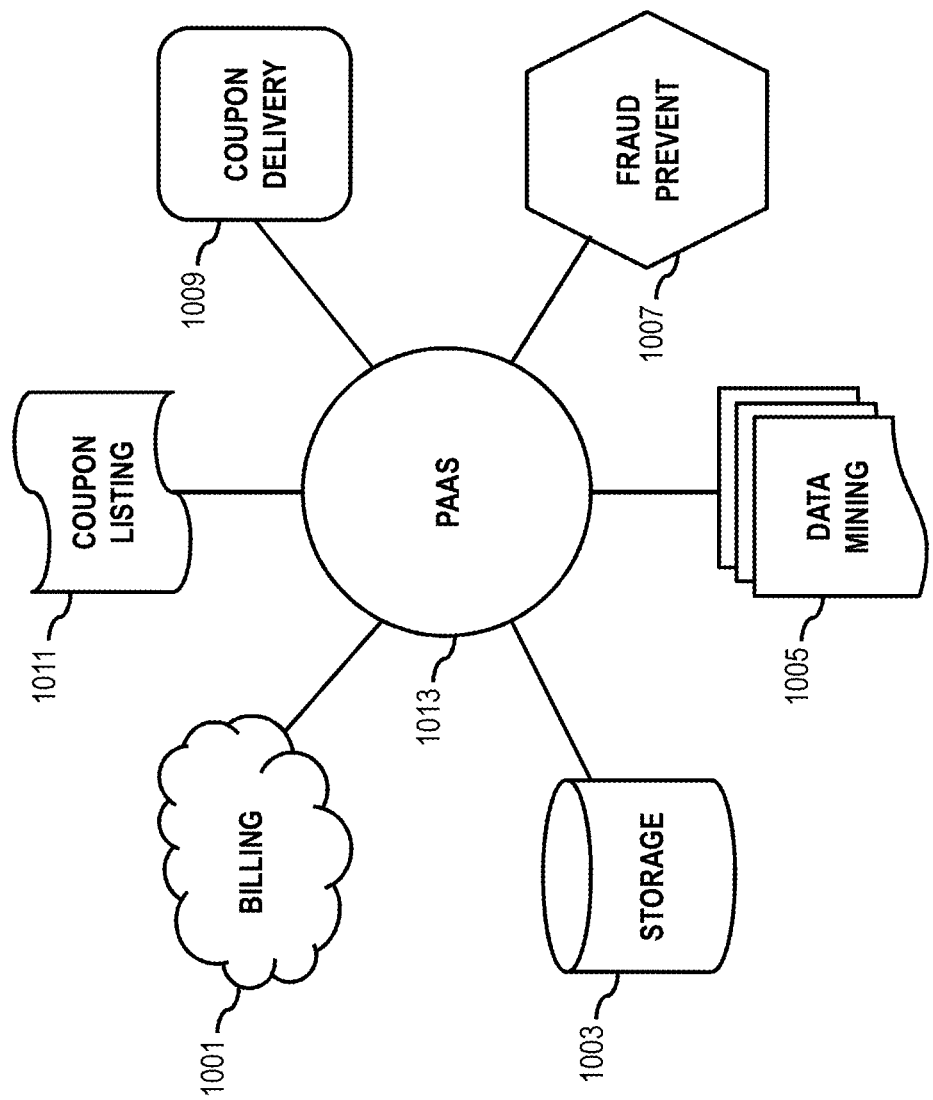
FIG. 10 is a diagram illustrating various functionalities of a Platform as a Service (PaaS) in an exemplary digital coupon marketplace, according to one embodiment.

FIG. 10 is a diagram illustrating functionalities of a Platform as a Service (PaaS) in an exemplary digital coupon marketplace, according to one embodiment. The functionalities of the PaaS 1013 may include, but is not restricted to, billing, storage, data mining, fraud prevention, coupon delivery, coupon listing, and the like. In one implementation, the PaaS may be the selection platform 115. The PaaS 1013 may generate a report for retailers for delivered and/or redeemed digital coupons by consumers. In one embodiment, the report may include, but is not restricted to, a bill, a digital coupon number, a consumer name, a date and/or time of delivery, a bidding price for a digital coupon, number of sensed movement at a user device 101, and the like. Further, the report is delivered to a coupon provider associated with the digital coupon delivered to the user device 101. In one embodiment, the report may be recorded in a coupon billing and/or account system associated with a retailer.

The PaaS 1013 may store digital coupons associated with retailers in a storage device 1003, such as the database 117. The storage device 1003 may store the digital coupons from advertisers and/or retailers that provide products and/or services. The storage device 1003 may also store profiles of the consumers, in one embodiment. In an exemplary embodiment, the consumer profile may include, but is not restricted to, a name, an email address, a phone number, a transaction history, a purchasing history, type of coupons redeemed, number of coupons redeemed, shopping statistics and habits, a product preference, and so forth. The consumer profile may be used to identify the consumer at the time of selecting a digital coupon for the customer. The storage device 1003 may also store profiles of the advertisers, in another embodiment. The advertiser's profile may include, but is not restricted to, a name, type of products and/or services offered, digital coupons, a bidding history, and the like. Further, the storage device 1003 may store predefined formats of digital coupons.

The data mining functionality 1005 of the PaaS 1013 may mine data to determine coupon selection parameters for the digital coupons. In an exemplary embodiment, data may include, but is not restricted to, location information, a movement of a user device, and the like may be determined. Further, the fraud prevention functionality 1007 may be used to verify and/or confirm the coupon redeeming by consumers. In one implementation, the personalized/serialized digital coupons may be verified by a coupon exchange server (not shown). The coupon delivery functionality 1009 is the functionality to deliver digital coupons to user devices associated with consumers. In one embodiment, the PaaS 1013 may transmit the digital coupon by, but not restricted to, a text message, a voice mail, an email, a pop-up in the application 103, and the like to a user device.

The PaaS 1013 may also have a coupon listing 1011 functionality that generates a list of digital coupons. In one embodiment, the list of digital coupon may be generated based on bids received from advertisers and/or retailers. In another embodiment, the PaaS 1013 may generate the list of digital coupon based on coupon delivery parameters provided by the advertisers and/or retailers. The coupon delivery parameter may include, but is not restricted to, provide coupon 1 when a first movement sensed at a user device 101, provide coupon 2 when a second movement sensed at a user device 101, and so forth. Further, the PaaS 1013 may also update position of digital coupons in the storage device 1003. The position of digital coupons in the storage device 1003 may be updated dynamically based on, but is not restricted to, a frequency of inquiry by consumers, a bidding price, number of times consumer redeemed the digital coupon, and the like.

Figure 11:
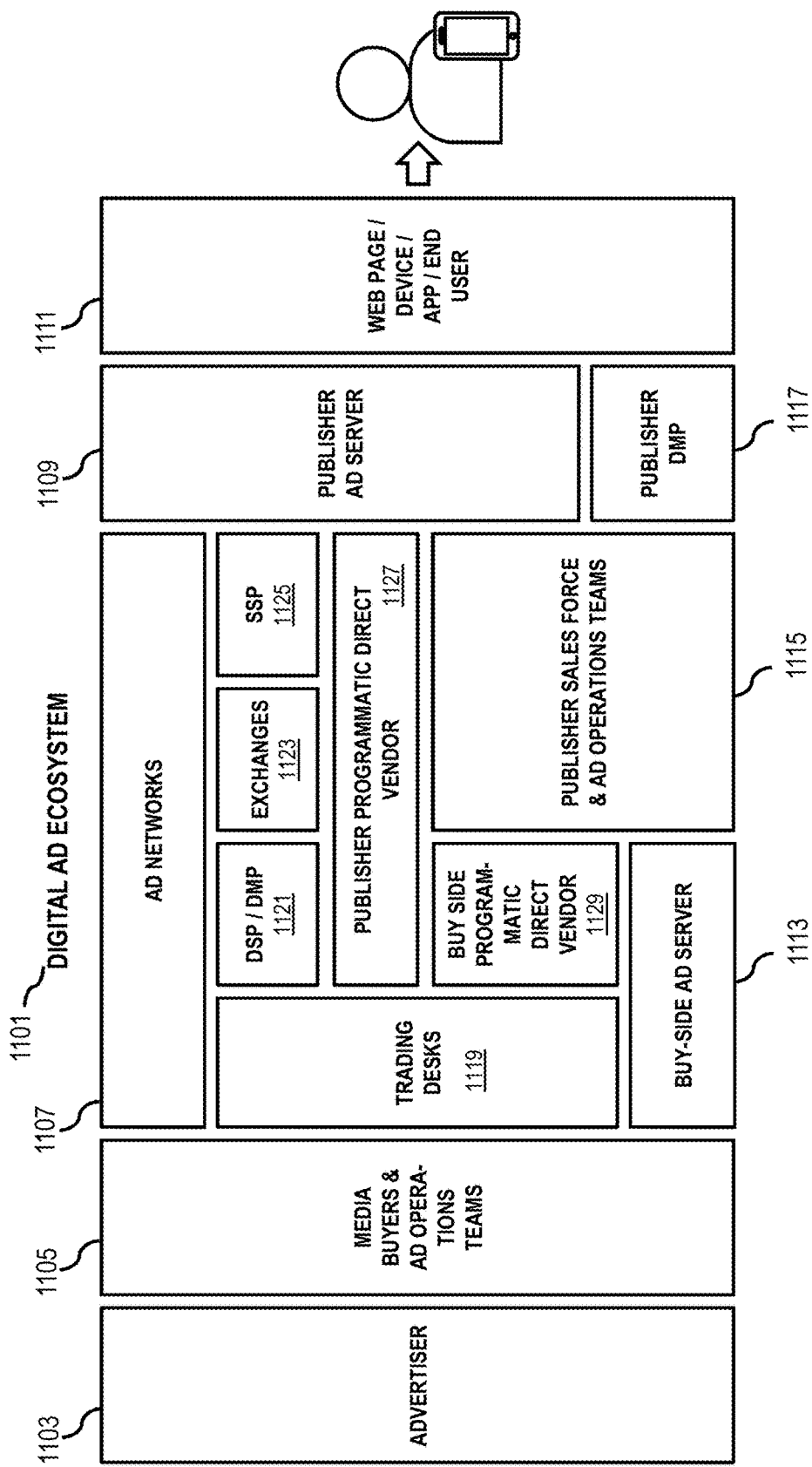
FIG. 11 is a diagram of a digital ad ecosystem, according to one embodiment.

FIG. 11 is a diagram of digital ad ecosystem 1101, according to one embodiment. The digital ad ecosystem 1101 may be divided into three parts; advertisers, publishers, and coupon broker. In the ecosystem, the advertiser's part may include, but is not limited to, an advertiser 1103, media buyers and ad operations teams 1105, trading desks 1119, a Demand Side Platform (DSP) or a Data Management Platform (DMP) 1121, a buy-side programmatic direct vendor 1129, and a buy-side ad server 1113. The publisher's side may include, but is not limited to, a publisher ad server 1109, a webpage, or a user device, an application or an end user 1111, a publisher sales force and ad operations teams 1115, a publisher Data Management Platform (DMP) 1117, and a publisher Programmatic Direct Vendor 1127. The coupon broker's side may include, but is not limited to, ad networks 1107, exchanges 1123, and a Supply Side Platform (SSP) 1125.

The advertiser 1103 desires to publish digital coupons on the user device 1111. The advertiser 1103 may be, but is not limited to, a retailer, a supplier, a vendor, a merchant, and the like. The media buyers and ad operations teams 1105 are configured to plan marketing, campaigns, create digital coupons, places the digital coupons in the media, and the like. The media buyers and ad operations teams 1105 works for the advertiser 1103 to provide their digital coupons to consumers. The media buyers and ad operations teams 1105 provide these digital coupons to the ad networks 1107 and/or the DSP 1121. The ad networks 1107 may connect the advertiser 1103 to the web page and/or user device 1111 that desires to host their or digital coupons. Further, the ad networks 1107 may aggregate the publisher's ad space and match it with the advertisers demand. The DSP 1121 interfaces with the advertiser 1103 to manage their ad exchange and data exchange accounts. The trading desks 1119 may be a management platform configured to manage programmatic bid-based media and audience buying to improve the advertiser's advertising performances and to increase their revenues. The trading desks 1119 generally operate with the DSP 1121. The buy-side programmatic direct vendor 1129 may provide a direct contact with the publisher to display their digital coupons.

Further, the exchange 1123 may provide a sales channel to the publishers from the advertiser 1103 through the ad networks 1107. The exchanges 1123 may facilitate an automatic bidding and/or selling technique of the digital coupons in real time. The exchange 1123 may decide when, where and which digital coupon is to be displayed at the user device 1111. The SSP 1125 may outsource digital coupons selling and ad network management services for the publishers. The SSP 1125 may interact with the DSP 1121 and/or the ad networks 1107 to sell impressions to the advertiser 1103 to publish their digital coupons on the user device 1111. The publisher DMP 1117 is configured to manage data of the publishers. The buy-side ad server 1113 and the publisher as server 1109 interact with each other to buy and/or sell their digital coupons. The media buyers and ad operations teams 1105 may directly buy a position spot to display their digital coupons from the publisher programmatic direct vendor 1127. The digital coupons of the advertiser 1103 is then displayed to the user device 1111 based on the interaction between the advertiser 1103 and the publisher through the exchange 1123.

Figure 12:
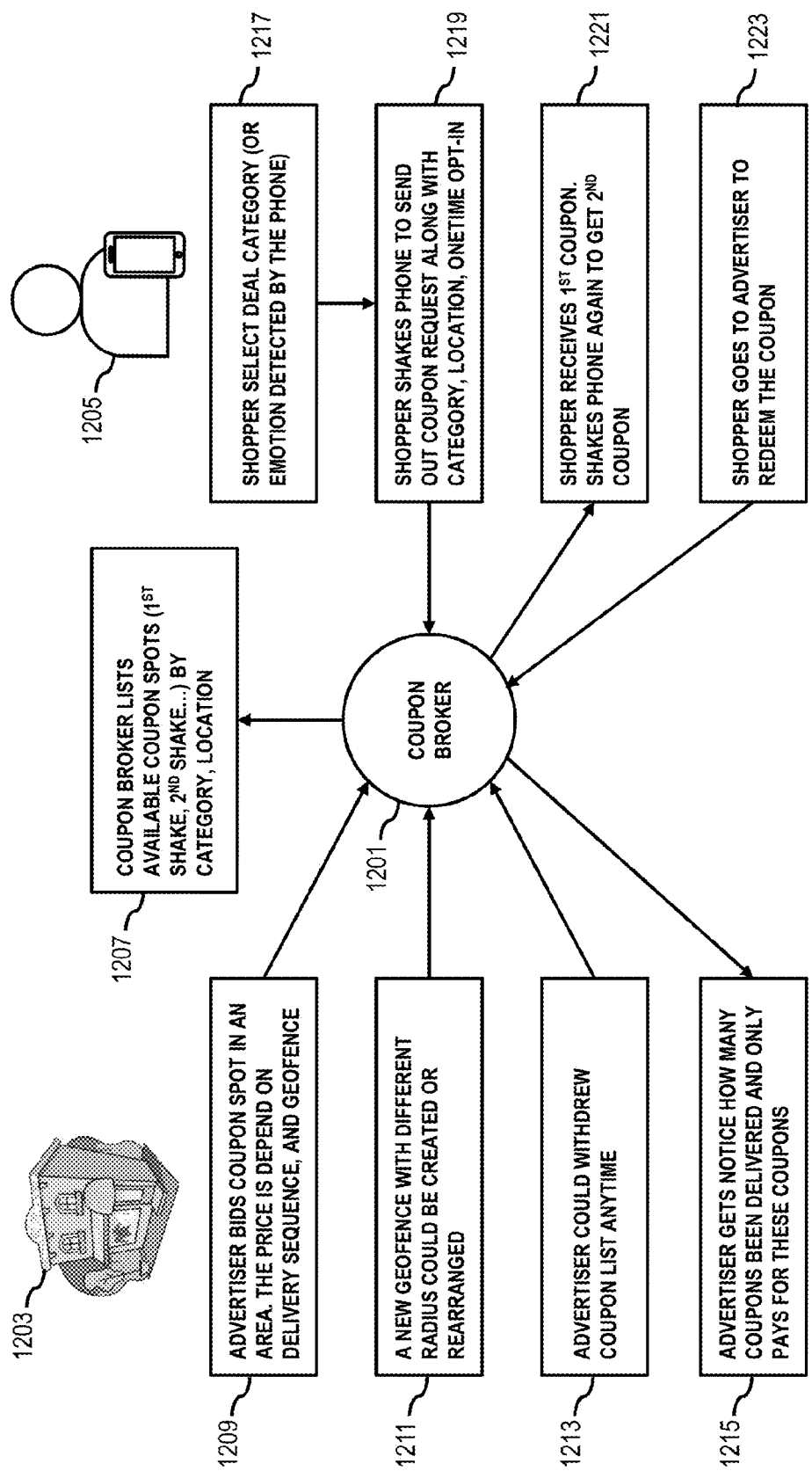
FIG. 12 is a workflow process for providing a digital coupon to a consumer, according to one embodiment.

FIG. 12 is a workflow process for providing a digital coupon to a consumer in an environment, according to one embodiment. A coupon broker 1201 communicates with the advertiser 1203 and a consumer and/or a shopper 1205. At step 1207, the coupon broker 1201 lists available digital coupon spots based on, but is not limited to, a shopping category, location information, and the like. At step 1209, an advertiser bids for a coupon spot in an area. The area may be a current location of the consumer. In one implementation, the bidding price may depend on, but is not restricted to, a digital coupon delivery sequence, geo-fence, a movement of a user device, and the like.

At step 1211, the advertiser may be given a new geo-fence having different radius. In an exemplary embodiment, a geo-fence may be considered as a virtual boundary around a point of location, for example, a retail store. Within the new geo-fence, the advertiser may be given a new geo-fence having smaller radius. The advertiser may then provide a higher bid price in order to provide a digital coupon and/or a coupon list to consumers. The advertiser may withdraw the coupon list at any time at step 1213.

Further, at step 1215, the advertise notices that how many digital coupons are delivered to consumers and/or are redeemed by the consumer. The advertiser may then pay fees only for these digital coupons. In an exemplary embodiment, the coupon provider may pay fees such as, a subscriber's fee, for the digital coupons delivered to the user device 101. In another exemplary embodiment, the coupon provider may pay fees for the digital coupons redeemed by the consumers at a retail store.

At the consumer's side, the consumer 1205 may select a deal category [1217]. The deal category may include, but is not restricted to, food, beverages, clothing, electronics, and the like. In an embodiment, the deal category may further be classified into, such as, men, women, teenagers, kids, etc. Also, an emotion of the consumer 1205 may be detected by using sensors 105 of the user device associated with the consumer 1205. The sensor 105 may determine the emotions of the consumers from, but is not restricted to, their touch on a Graphical user Interface (GUI) of a user device 101, usage of their user devices 101, gestures, and the like. Further, the sensors 105 determine location information of the user device, the consumer, or a combination thereof.

At step 1219, the consumer may then shakes the user device to send a digital coupon request along with the selected category, location information, emotions, and the like to the coupon broker 1201. Based on the shaking movement of the user device, the consumer receives a digital coupon from the coupon broker 1201, at step 1221. If the consumer shakes the user device again, a second request is transmitted to the coupon broker 1201 that further provides a second digital coupon to the consumer. At the step 1223, the consumer may then redeem the digital coupon at a retail store of the advertiser 1203.

Figure 13:
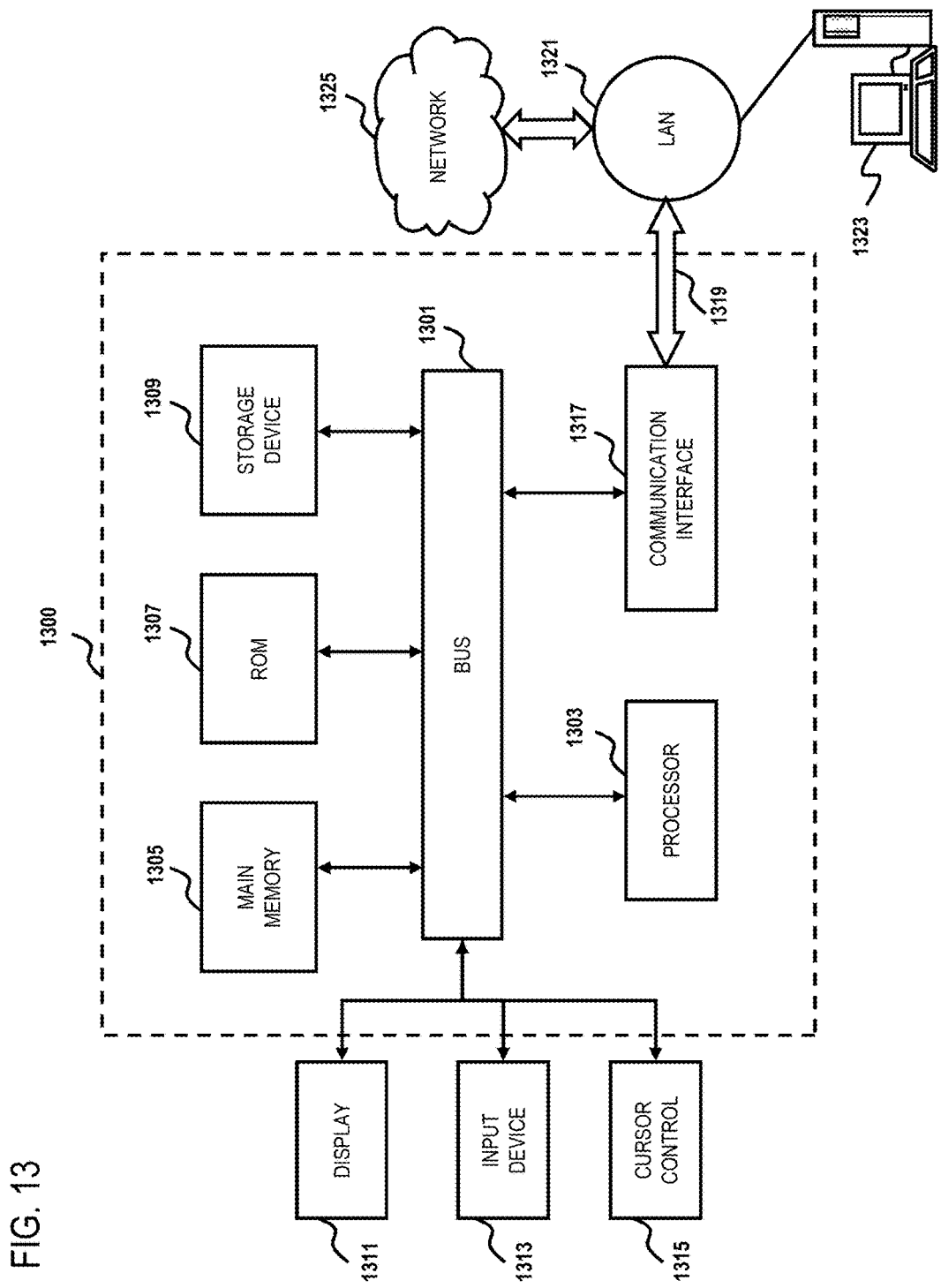
FIG. 13 is a diagram of a computer system that can be used to implement various exemplary embodiments.

FIG. 13 illustrates a computing hardware (e.g., mobile system) 1300 on which exemplary embodiments may be implemented. The mobile system 1300 includes a bus 1301 or other communication mechanism for communicating information and a processor 1303 coupled to the bus 1301 for processing the information. The mobile system 1300 also includes a main memory 1305, such as a Random Access Memory (RAM) or other dynamic storage device, coupled to the bus 1301 for storing the information and instructions to be executed by the processor 1303. The main memory 1305 may also be used for storing temporary variables or other intermediate information during execution of instructions by the processor 1303. The mobile system 1300 may further include a Read Only Memory (ROM) 1307 or other static storage device coupled to the bus 1301 for storing static information and instructions for the processor 1303. A storage device 1309, such as a magnetic disk or an optical disk, is coupled to the bus 1301 for persistently storing information and instructions.

The mobile system 1300 may be coupled via the bus 1301 to a display 1311, such as a Cathode Ray Tube (CRT), a liquid crystal display, an active matrix display, or a plasma display, for displaying information to the mobile user. An input device 1313, such as a keyboard including alphanumeric and other keys, is coupled to the bus 1301 for communicating information and command selections to the processor 1303. Another type of a user input device may be a cursor control 1315, such as a mouse, a trackball, or cursor direction keys, for communicating direction information and command selections to the processor 1303 and for controlling cursor movement on the display 1311.

According to an exemplary embodiment, the processes described herein are performed by the mobile system 1300, in response to the processor 1303 executing an arrangement of instructions contained in the main memory 1305. Such instructions may be read into the main memory 1305 from another computer-readable medium, such as the storage device 1309. Execution of the arrangement of instructions contained in the main memory 1305 causes the processor 1303 to perform the process steps described herein. One or more processors in a multi-processing arrangement may also be employed to execute the instructions contained in the main memory 1305. In alternative embodiments, hard-wired circuitry may be used in place of or in combination with software instructions to implement exemplary embodiments. Thus, exemplary embodiments are not limited to any specific combination of hardware circuitry and software.

The mobile system 1300 may also include a communication interface 1317 coupled to the bus 1301. The communication interface 1317 provides a two-way data communication coupling to a network link 1319 connected to a Local Area Network (LAN) 1321. For example, the communication interface 1317 may be a Digital Subscriber Line (DSL) card or modem, an Integrated Services Digital Network (ISDN) card, a cable modem, a telephone modem, or any other communication interface to provide a data communication connection to a corresponding type of communication line. As another example, the communication interface 1317 may be a Local Area Network (LAN) card (e.g., for Ethernet™ or an Asynchronous Transfer Mode (ATM) network) to provide a data communication connection to a compatible LAN. Wireless links may also be implemented, in one embodiment. In any such implementation, the communication interface 1317 sends and receives electrical, electromagnetic, or optical signals that carry digital data streams representing various types of information. Further, the communication interface 1317 may include peripheral interface devices, such as a Universal Serial Bus (USB) interface, a Personal Computer Memory Card International Association (PCMCIA) interface, etc. Although a single communication interface 1317 is depicted in FIG. 13, multiple communication interfaces may also be employed.

The network link 1319 typically provides data communication through networks to other data devices. For example, the network link 1319 may provide a connection through the LAN 1321 to a host computer 1323, which has connectivity to a network 1325 (e.g., a Wide Area Network (WAN) or the global packet data communication network now commonly referred to as the "Internet") or to data equipment operated by a service provider. The LAN 1321 and the network 1325 both use electrical, electromagnetic, or optical signals to convey information and instructions.

The signals through the various networks and the signals on the network link 1319 and through the communication interface 1317, which communicate digital data with the mobile system 1300, are exemplary forms of carrier waves bearing the information and instructions.

The mobile system 1300 may send messages and receive data, including program code, through the network(s), the network link 1319, and the communication interface 1317. In the Internet example, a server (not shown) might transmit requested code belonging to an application program for implementing an exemplary embodiment through the network 1325, the LAN 1321 and the communication interface 1317. The processor 1303 may execute the transmitted code while being received and/or store the code in the storage device 1309, or other non-volatile storage for later execution. In this manner, the mobile system 1300 may obtain application code in the form of a carrier wave.

The term "computer-readable medium" as used herein refers to any medium that participates in providing instructions to the processor 1303 for execution. Such a medium may take many forms, including but not limited to non-volatile media, volatile media, and transmission media. Non-volatile media may include, for example, optical or magnetic disks, such as the storage device 1309. Volatile media may include a dynamic memory, such as the main memory 1305. Transmission media may include coaxial cables, copper wire and fiber optics, including the wires that include the bus 1301. Transmission media may also take the form of acoustic, optical, or electromagnetic waves, such as those generated during Radio Frequency (RF) and infrared (IR) data communications. Common forms of computer-readable media may include, for example, a floppy disk, a flexible disk, hard disk, magnetic tape, any other magnetic medium, a CD-ROM, a Compact Disc-Rewritable (CDRW), a Digital Video Disk (DVD), any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read. In certain cases, the computer readable media may include an unknown physical component wherein the information is uniquely defined by a special digital unique identifier and is available through multiple physical channels either simultaneously or exclusively.

Various forms of computer-readable media may be involved in providing instructions to a processor for execution. For example, the instructions for carrying out at least part of the exemplary embodiments may initially be borne on a magnetic disk of a remote mobile device. In such a scenario, the remote mobile device loads the instructions into the main memory and sends the instructions over a telephone line using a modem. A modem of a local computer system receives the data on the telephone line and uses an infrared transmitter to convert the data to an infrared signal and transmit the infrared signal to a portable computing device, such as a Personal Digital Assistant (PDA) or a laptop. An infrared detector on the portable computing device receives the information and instructions borne by the infrared signal and places the data on a bus. The bus conveys the data to a main memory, from which a processor retrieves and executes the instructions. The instructions received by the main memory can optionally be stored on storage device either before or after execution by processor.

Figure 14:
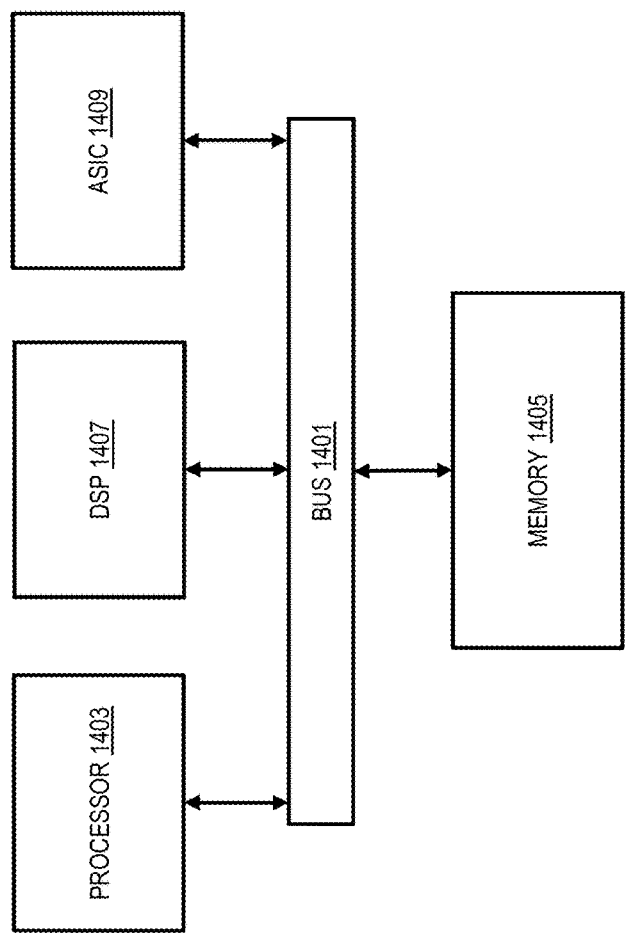
FIG. 14 is a diagram of a chip set upon which an embodiment of the invention may be implemented, according to one embodiment.

FIG. 14 illustrates a chip set 1400 upon which an embodiment of the invention may be implemented. The chip set 1400 is programmed to present a slideshow as described herein and includes, for instance, the processor and memory components described with respect to FIG. 14 incorporated in physical packages (e.g., chips). By way of example, a physical package may include an arrangement of materials, components, and/or wires on a structural assembly (e.g., a baseboard) to provide characteristics such as physical strength, conservation of size, and/or limitation of electrical interaction. It is contemplated that in certain embodiments the chip set 1400 can be implemented in a single chip.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include processing cores with each core to perform independently. A multi-core processor enables multiprocessing within a single physical package. Examples of a multi-core processor may include two, four, eight, or greater numbers of processing cores. Alternatively or in addition, the processor 1403 may include microprocessors configured in tandem via the bus 1401 to enable independent execution of instructions, pipelining, and multithreading. The processor 1403 may also be accompanied with specialized components to perform certain processing functions and tasks such as Digital Signal Processors (DSP) 1407, or Application-Specific Integrated Circuits (ASIC) 1409. The DSP 1407 typically processes real-world signals (e.g., sound) in real-time independently of the processor 1403. Similarly, the ASIC 1409 may perform specialized functions not easily performed by a general purposed processor. Other specialized components to aid in performing the inventive functions described herein include Field Programmable Gate Arrays (FPGA) (not shown), controllers (not shown), or other special-purpose computer chips.

The processor 1403 and accompanying components have connectivity to the memory 1405 via the bus 1401. The memory 1405 may include both a dynamic memory (e.g., RAM, magnetic disk, writable optical disk, etc.) and a static memory (e.g., ROM, CD-ROM, etc.) for storing executable instructions that when executed perform the inventive steps described herein to controlling a mobile device. The memory 1405 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    storing information indicating that a first digital coupon should be provided to a device when one movement is detected at the device, and that a second digital coupon should be provided to the device when a plurality of movements, including another movement subsequent to the one movement, is detected at the device;
    sensing a series of movements of the device, the series of movements including a first movement and a second movement subsequent to the first movement, the first and second movements each including a shaking movement;
    determining a location of the device when the series of movements was sensed;
    selecting the first digital coupon based on:
        the information indicating that the first digital coupon should be provided when one movement is detected at the device;
        the sensing of the first movement, and
        the determined location of the device;
    delivering the selected first digital coupon to the device, wherein delivering the selected first digital coupon causes the device to display the first digital coupon;
    selecting the second digital coupon based on:
        the information indicating that the second digital coupon should be provided when the plurality of movements are detected at the device;
        the sensing of the first movement,
        the sensing of the second movement subsequent to the first movement, wherein the second movement is sensed while the first digital coupon is displayed at the device, and
        the determined location of the device; and
    delivering the selected second digital coupon to the device, wherein delivering the selected second digital coupon causes the device to alter a manner in which the first digital coupon is displayed, and further causes the device to display the second digital coupon.

2. The method of claim 1, further comprising:
    initiating an opt-in request for enrolling in a digital couponing service based on the first movement and the second movement; and
    triggering an authentication mechanism with the digital couponing service to provision the delivering of the first and second digital coupons to the device.

3. The method of claim 2, further comprising:
    presenting an opt-out option for the digital couponing service after the first and second digital coupons are delivered.

4. The method of claim 1, further comprising:
    determining one or more coupon selection parameters associated with the device or a user of the device, the coupon selection parameters including at least one of:
        a transaction history associated with the device or the user,
        a purchasing history associated with the device or the user, or
        a type of coupons redeemed via the device or by the user,
    wherein the first digital coupon or the second digital coupon is selected further based on the one or more coupon selection parameters.

5. The method of claim 1, further comprising:
    receiving a prioritization request from a coupon provider to rank the first digital coupon first in a ranked list that includes plurality of digital coupons; and
    selecting, based on the prioritization request, the first digital coupon as the first digital coupon for delivery to the device based on the sensing of the first movement.

6. The method of claim 1, further comprising:
    personalizing the first and second digital coupons based on the device prior to the delivering of the first and second digital coupons to the device.

7. The method of claim 1, wherein the first digital coupon is a different digital coupon than the second digital coupon.

8. The method of claim 1, further comprising:
    receiving a selection of a particular category, wherein selecting the first and second digital includes identifying that the first and second digital coupons are associated with the particular category.

9. The method of claim 1, wherein the altered manner of displaying the first digital coupon includes reducing a size of the first digital coupon on a display of the device, and wherein causing the device to display the second digital coupon further includes causing the device to display the second digital coupon with a size that is larger than the reduced size of the first digital coupon.

10. The method of claim 1, wherein the altered manner of displaying the first digital coupon includes replacing the first digital coupon, on a display of the device, with the second digital coupon.

11. An apparatus, comprising:
a non-transitory computer-readable medium storing processor-executable instructions; and
a processor configured to execute the processor-executable instructions, wherein executing the processor-executable instructions causes the processor to:
store information indicating that a first digital coupon should be provided to a device when one movement is detected at the device, and that a second digital coupon should be provided to the device when a plurality of movements, including another movement subsequent to the one movement, is detected at the device;
determine that a series of movements, of the device, have been sensed by the device, the series of movements including a first movement and a second movement subsequent to the first movement, the first and second movements each including a shaking movement;
determine a location of the device when the series of movements was sensed;
select the first digital coupon based on:
the sensing of the first movement,
the information indicating that the first digital coupon should be provided when one movement is detected at the device, and
the determined location of the device;
deliver the selected first digital coupon to the device, wherein delivering the selected first digital coupon causes the device to display the first digital coupon;
select the second digital coupon based on:
the sensing of the first movement,
the sensing of the second movement subsequent to the first movement, wherein the second movement is sensed while the first digital coupon is displayed at the device,
the information indicating that the second digital coupon should be provided when the plurality of movements are detected at the device, and
the determined location of the device; and
deliver the selected second digital coupon to the device, wherein delivering the selected second digital coupon causes the device to alter a manner in which the first digital coupon is displayed, and further causes the device to display the second digital coupon.

12. The apparatus of claim 11, wherein executing the processor-executable instructions further causes the processor to:
initiate an opt-in request for enrolling in a digital couponing service based on the first movement and the second movement; and
trigger an authentication mechanism with the digital couponing service to provision the delivering of the first and second digital coupons to the device.

13. The apparatus of claim 12, wherein executing the processor-executable instructions further causes the processor to:
present an opt-out option for the digital couponing service after the first and second digital coupons are delivered.

14. The apparatus of claim 11, wherein executing the processor-executable instructions further causes the processor to:
determine one or more coupon selection parameters associated with the device or a user of the device, the coupon selection parameters including at least one of:
a transaction history associated with the device or the user,
a purchasing history associated with the device or the user, or
a type of coupons redeemed via the device or by the user,
wherein the first digital coupon or the second digital coupon is selected further based on the one or more coupon selection parameters.

15. The apparatus of claim 11, wherein executing the processor-executable instructions further causes the processor to:
receive a prioritization request from a coupon provider to rank the first digital coupon first in a ranked list that includes the first and second digital coupons; and
select, based on the prioritization request, the first digital coupon as the first digital coupon for delivery to the device based on the sensing of the first movement.

16. The apparatus of claim 15, wherein executing the processor-executable instructions further causes the processor to:
initiate a ranking of the first and second digital coupons based on a bidding process by the coupon provider and a coupon provider associated with the second digital coupon,
wherein the selecting of the first digital coupon as the first digital coupon is further based on the ranking.

17. The apparatus of claim 11, wherein executing the processor-executable instructions further causes the processor to:
personalize the first and second digital coupons based on the device prior to the delivering of the first and second digital coupons to the device.

18. The apparatus of claim 11, wherein the first digital coupon is a different digital coupon than the second digital coupon.

19. A non-transitory computer-readable medium storing a set of processor-executable instructions, which, when executed by a processor, cause the processor to:
sense a series of shaking movements of a device, the series of shaking movements including a first shaking movement and a second shaking movement subsequent to the first shaking movement;
determine a location of the device when the series of shaking movements was sensed;
select a first digital coupon based on:
the sensing of the first shaking movement,
information that specifies that the first digital coupon should be provided to the device when one movement is sensed at the device, and
the determined location of the device;
deliver the selected first digital coupon, wherein delivering the selected first digital coupon causes the device to display the first digital coupon;
select a second digital coupon based on:
the sensing of the first shaking movement, the sensing of the second shaking movement subsequent to the first shaking movement, wherein the second movement is sensed while the first digital coupon is displayed at the device,
information that specifies that the second digital coupon should be provided to the device when a plurality of movements are detected a the device, and the determined location of the device; and
deliver the selected second digital coupon to the device, wherein delivering the selected second digital coupon causes the device to alter a manner in which the first digital coupon is displayed, and further causes the device to display the second digital coupon.

20. The non-transitory computer-readable medium of claim 19, wherein the set of processor-executable instructions further includes processor-executable instructions to:
initiate an opt-in request for enrolling in a digital couponing service based on the first shaking movement and the second shaking movement; and
trigger an authentication mechanism with the digital couponing service to provision the delivering of the first and second digital coupons to the device.

21. The non-transitory computer-readable medium of claim 20, wherein the set of processor-executable instructions further includes processor-executable instructions to:
present an opt-out option for the digital couponing service after the first and second digital coupons are delivered.

22. The non-transitory computer-readable medium of claim 19, wherein the first coupon includes a discount for a product or service, wherein an amount of the discount is determined based on a distance between the device and a location associated with the product or service.

23. The non-transitory computer-readable medium of claim 19, wherein the first digital coupon is a different digital coupon than the second digital coupon.

24. The non-transitory computer-readable medium of claim 19, wherein the altered manner of displaying the first digital coupon includes reducing a size of the first digital coupon on a display of the device, and wherein the processor-executable instructions, to deliver the second digital coupon cause the device to display the second digital coupon with a size that is larger than the reduced size of the first digital coupon.

\* \* \* \* \*